United States Patent
Fujita et al.

(10) Patent No.: US 8,339,650 B2
(45) Date of Patent: Dec. 25, 2012

(54) IMAGE FORMING APPARATUS, IMAGE FORMING METHOD, AND STORAGE MEDIUM

(75) Inventors: Takeshi Fujita, Tokyo (JP); Hideaki Matsui, Kawasaki (JP); Kazuma Saito, Takahagi (JP); Daisuke Okada, Wako (JP)

(73) Assignee: Ricoh Company, Ltd., Tokyo (JP)

( * ) Notice: Subject to any disclaimer, the term of this patent is extended or adjusted under 35 U.S.C. 154(b) by 1261 days.

(21) Appl. No.: 12/153,048

(22) Filed: May 13, 2008

(65) Prior Publication Data

US 2008/0285997 A1    Nov. 20, 2008

(30) Foreign Application Priority Data

May 14, 2007    (JP) ................................ 2007-128021

(51) Int. Cl.
*G06K 15/00* (2006.01)
*G06F 3/12* (2006.01)

(52) U.S. Cl. ....................... 358/1.17; 358/1.13; 358/1.18

(58) Field of Classification Search .................. None
See application file for complete search history.

(56) References Cited

U.S. PATENT DOCUMENTS

| | | | |
|---|---|---|---|
| 5,954,436 A * | 9/1999 | Kageyama et al. | 400/188 |
| 2003/0081239 A1* | 5/2003 | Asahi | 358/1.15 |
| 2004/0070788 A1* | 4/2004 | Barry et al. | 358/1.15 |
| 2006/0001896 A1* | 1/2006 | Sakamoto | 358/1.13 |
| 2006/0133844 A1* | 6/2006 | Konno | 399/82 |
| 2006/0210296 A1* | 9/2006 | Sakata et al. | 399/82 |
| 2007/0030514 A1* | 2/2007 | Shima | 358/1.15 |

FOREIGN PATENT DOCUMENTS

| | | | |
|---|---|---|---|
| JP | 6-106813 A | * | 4/1994 |
| JP | 2001-130068 | | 5/2001 |
| JP | 3380598 | | 12/2002 |
| JP | 3970693 | | 6/2007 |

OTHER PUBLICATIONS

Abstract of JP 06-122236 published May 6, 1994.
Abstract of JP 2004-005241 published Jan. 8, 2004.

* cited by examiner

*Primary Examiner* — King Poon
*Assistant Examiner* — Vincent Peren
(74) *Attorney, Agent, or Firm* — Harness, Dickey & Pierce, P.L.C.

(57) ABSTRACT

An image forming apparatus, an image forming method, and a storage medium. The image forming apparatus includes a memory, a frame creator to create at least one rendering frame in the memory, a renderer to render rendering data on the at least one rendering frame based on print data, and a control device to arrange the rendering data according to a sequence of the print data in duplex printing.

1 Claim, 13 Drawing Sheets

FIG. 3
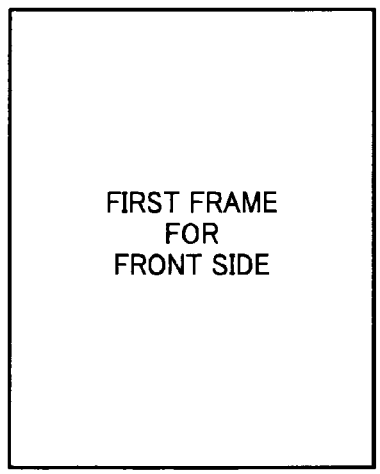
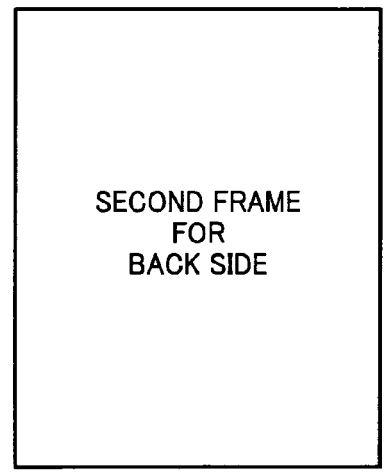

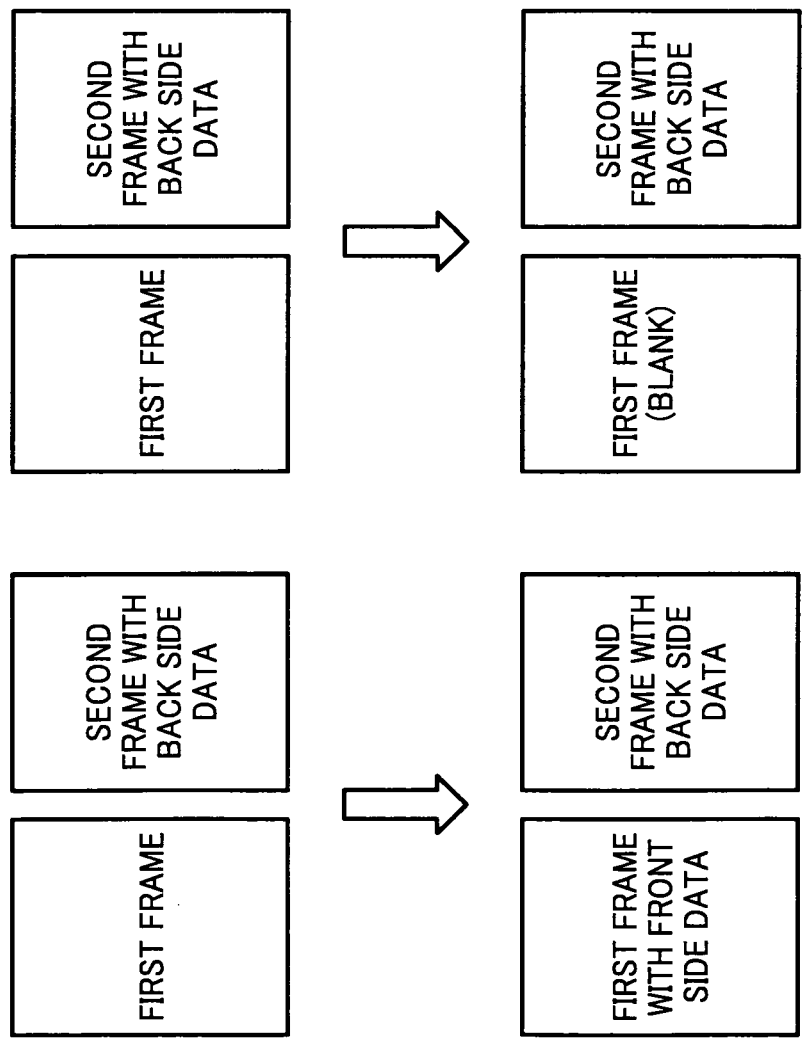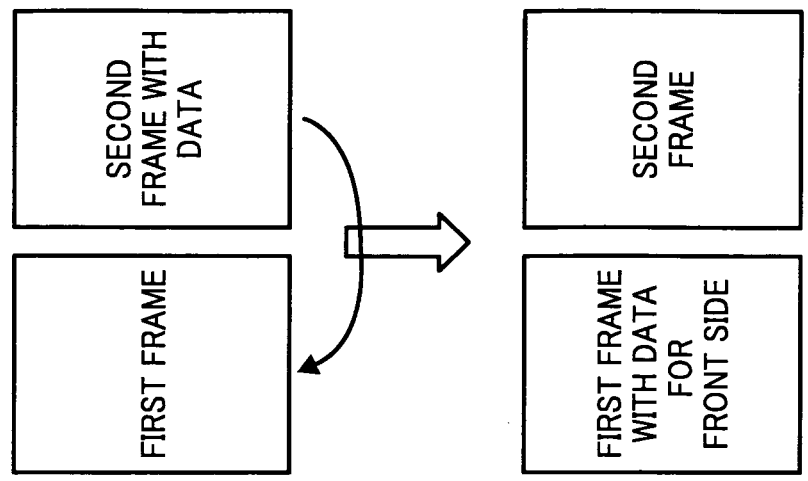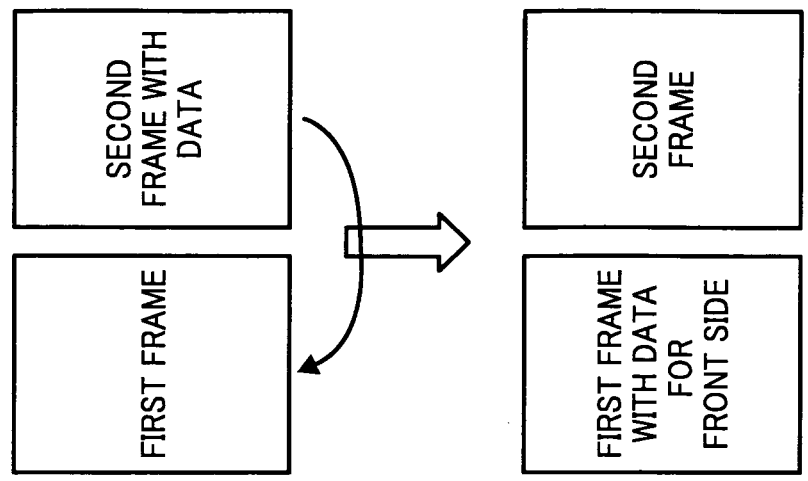

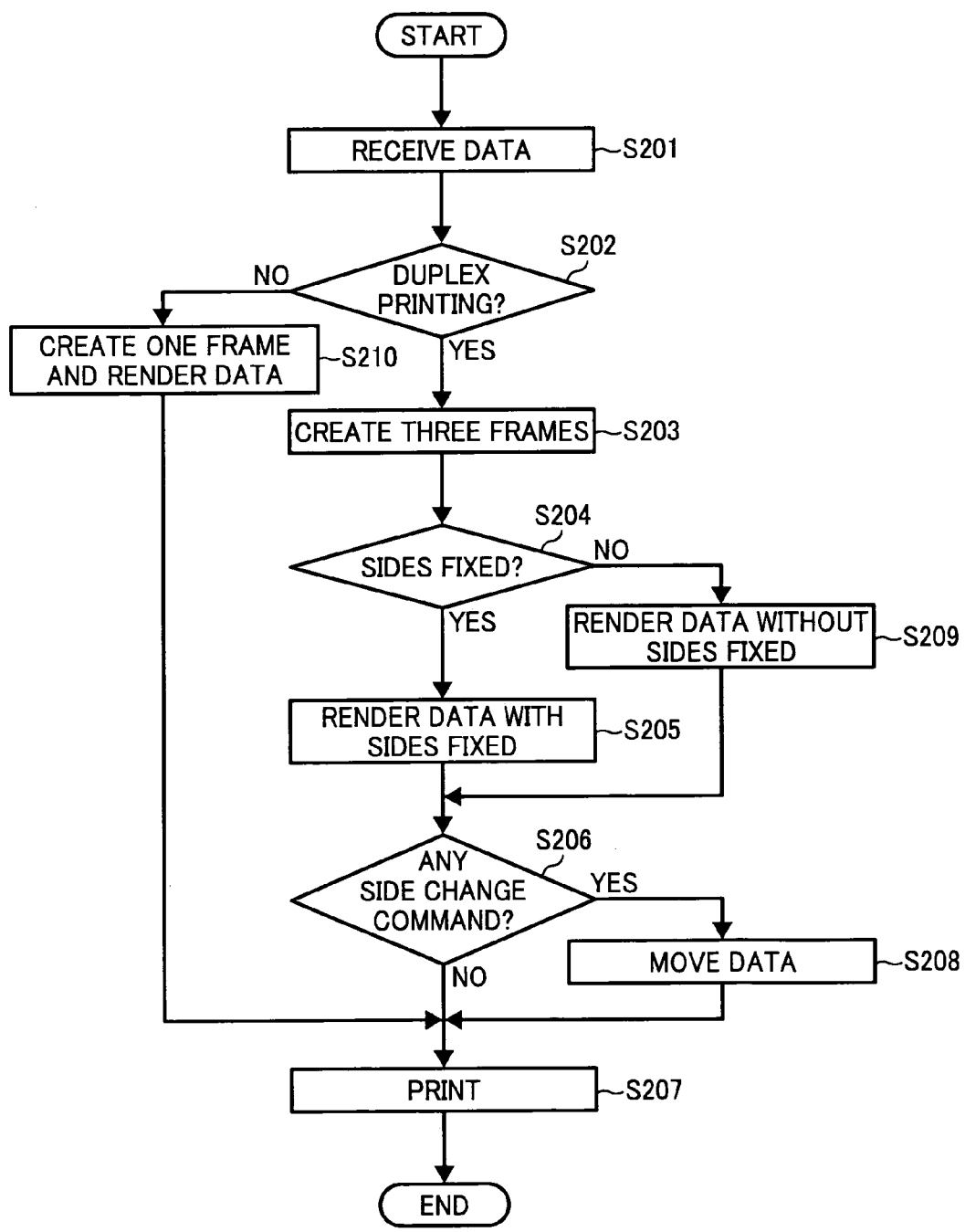

FIG. 6
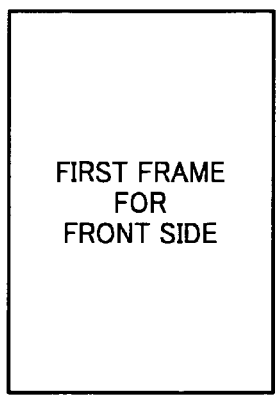
FIRST FRAME
FOR
FRONT SIDE
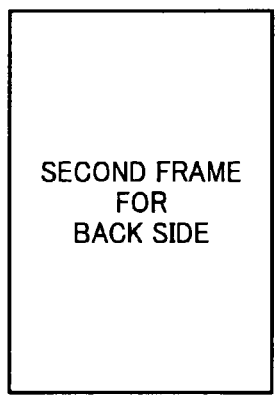
SECOND FRAME
FOR
BACK SIDE
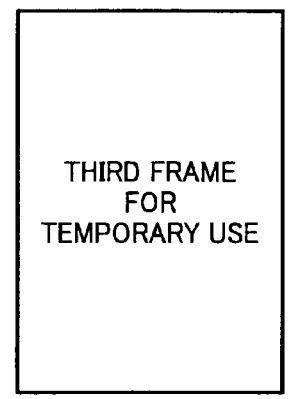
THIRD FRAME
FOR
TEMPORARY USE

IMAGE FORMING APPARATUS, IMAGE FORMING METHOD, AND STORAGE MEDIUM

CROSS-REFERENCE TO RELATED APPLICATION

This patent specification is based on and claims priority from Japanese Patent Application No. 2007-128021, filed on May 14, 2007 in the Japan Patent Office, the entire contents of which are hereby incorporated by reference herein.

BACKGROUND

1. Field of the Invention

The present invention relates to an image forming apparatus, an image forming method, and a storage medium.

2. Description of the Related Art

In recent years, an image forming apparatus such as a printer has been offering duplex printing, i.e., printing on both sides of a sheet of paper to save paper resources.

One such known image forming apparatus performs automatic duplex printing in which a sheet of paper is automatically reversed in the image forming apparatus so that printing is automatically performed on both sides of the sheet, in page order.

Another known image forming apparatus allows manual duplex printing, in which sheets with one side printed with images on odd-numbered pages of print data are sequentially discharged onto a paper output tray and, after the images on the odd-numbered pages have been printed, the discharged sheets are manually moved to a paper feed tray or a manual feed tray so that the other side of the sheets is printed with images on even-numbered pages of the print data in response to a print instruction.

In one conventional example, automatic duplex printing is performed by sending print data written in a PDL (Page Description Language) from a host device to the image forming apparatus; generating image data to be rendered based on the print data; individually managing the image data as duplex printing information that associates first and second pages of the image data with the front and back sides of a printing medium such as a sheet of paper; exchanging page information that defines attributes of the duplex printing information between an information management unit and an image forming unit to control duplex printing; transmitting the duplex printing information on the first or second page of the image data from an information processing device to the image forming apparatus according to the page information; and forming an image based on the duplex printing information with the image forming unit.

In another conventional example, automatic duplex printing is performed by alternating between printing on the front side of a plurality of sheets and printing on the back side of the plurality of sheets based on received print data, and a command that specifies the end of duplex printing is added to the end of the print data of documents for duplex printing. Upon detection of this command, the sheets present in the printer are discharged and the duplex printing ends.

However, as described above, the conventional techniques only allow duplex printing based on the duplex printing information associating first and second pages of image data with the front and back sides of a sheet, or use the command specifying the end of duplex printing to discharge the sheets present in the printer. The conventional techniques are not available to achieve intended duplex printing by replacing or deleting rendering data rendered on a rendering frame in a memory, and therefore need to be improved.

Specifically, to obtain desirable printing results by printing with rendering data rendered on a plurality of rendering frames that are simultaneously created in a memory, processing such as replacing the rendering data or deleting the rendering data on some of the rendering frames to print the remaining rendering data may be needed. However, the rendering data rendered on the rendering frame in the memory cannot be processed by the conventional techniques.

Conventionally, rendering frames are processed for the front and back sides of a sheet in the order in which the rendering frames are created. In addition, when a plurality of rendering frames is present in the memory, the rendering data on a rendering frame for a first page cannot be individually deleted insofar as the rendering data can only be deleted in order from the last page to the first page. Therefore, in this case, a user needs to delete the rendering data on all of the rendering frames, resend print data according to intended printing conditions, and render rendering data on the rendering frames in the memory again, which is inconvenient for the user.

Specifically, in conventional duplex printing using a common page description language, two rendering frames are created, i.e. a first frame for the front side and a second frame for the back side, and print data are converted into rendering data and sequentially rendered on the first and second frames. Such processing of creating frames and rendering data is repeated. The processing is basically as follows: generate rendering data for the front side; create a frame for the front side; render the rendering data for the front side; print; generate rendering data for the back side; create a frame for the back side; render the rendering data for the back side; and print, thereby completing duplex printing on one sheet.

To have the front side blank in the conventional duplex printing using a common page description language, the processing is performed as follows: generate rendering data for the front side (blank); create a frame for the front side; render the rendering data for the front side (blank); print; generate rendering data for the back side; create a frame for the back side; render the rendering data for the back side; and print, thereby completing duplex printing on one sheet.

Accordingly, printing on a sheet is appropriately performed in order of front and back sides when print data are sent in order of page data for the front side and then page data for the back side.

As described above, rendering data are normally rendered in order of transmission of print data. Duplex printing is controlled by typical page description languages so that the data for the front side are always rendered on the first created frame and the data for the back side are always rendered on the second created frame, i.e., the frames for rendering the data are always fixed at the start of printing.

However, some particular page description languages may specify duplex printing and not specify the front and back sides at the start of printing (start of rendering data). Such page description languages may determine the front and back sides or specify movement of the rendering data upon completion of data rendering for the front and back sides in the above-described processing. In this case, the front and back sides are determined after rendering data and intended printing may be in reverse order to transmission of the print data.

The conventional techniques do not support printing with a first created frame for the back side, i.e., printing only on the back side in duplex printing. Specifically, for example, when a first created frame is for the back side, the first frame is changed to a frame for the front side and printed on one side of a sheet, i.e., the first duplex printing is changed to simplex printing. Then, duplex printing is performed with a second created frame, which is created for the front side of the originally first duplex printing.

However, when a third created frame is for the front side for the originally second duplex printing, the second created frame, which has the rendering data for the front side for duplex printing and waits for the frame for the back side to perform duplex printing, is printed on one side of a sheet by changing duplex printing to simplex printing.

When the third created frame is for the back side for the originally second duplex printing, the third created frame is used for the back side of the second created frame, which has the rendering data for the front side for duplex printing and waits for the frame for the back side. In either case, the printing result is different from what is intended.

In addition, the page description language may perform printing by canceling rendering data for the front side and changing rendering data for the back side to rendering data for the front side upon completion of data rendering for the front and back sides in the above-described processing. In this case, with the conventional techniques, it is impossible to delete only the rendering data on the first frame and print only the rendering data on the second frame, and thereby intended printing cannot be performed.

Further, the page description language may perform printing only with rendering data for the back side by canceling rendering data for the front side upon completion of data rendering for the front and back sides in the above-described processing. Also, in this case, with the conventional techniques, it is impossible to delete only the rendering data on the first frame and print only the rendering data on the second frame, and thereby intended printing cannot be performed.

Still further, in printing only on the back side with the front side blank, dummy data are rendered on the first frame as rendering data for the front side. In this case, transmission of the dummy data with a page description language requires processing such as data transmission and data analysis, thereby decreasing throughput during printing. In addition, when the page description language does not support data or a command for creating dummy data, data rendering for the back side is performed without rendering blank data for the front side on the first frame, which may cause inappropriate duplex printing.

SUMMARY

This patent specification describes a novel image forming apparatus that includes a controller configured to convert print data into rendering data and output the rendering data. The controller includes a memory, a frame creator to create at least one rendering frame in the memory, a renderer to render rendering data on the at least one rendering frame based on print data, and a control device to arrange the rendering data according to a sequence of the print data in duplex printing.

This patent specification further describes a novel image forming method including creating at least one rendering frame, rendering rendering data on the at least one rendering frame based on print data, and arranging the rendering data according to a sequence of the print data in duplex printing.

This patent specification further describes a novel storage medium storing an image forming control program for controlling the image forming apparatus described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a schematic diagram illustrating two rendering frames created in the process shown in FIG. 2;

FIGS. 4A, 4B, and 4C are diagrams illustrating a rendering and arranging process in the process shown in FIG. 2;

FIG. 5 is a flowchart illustrating a rendering, arranging, and printing process performed by a printer employing a second embodiment of the present invention;

FIG. 6 is a schematic diagram illustrating three rendering frames created in the process shown in FIG. 5;

DETAILED DESCRIPTION OF PREFERRED EMBODIMENTS

Figure 1:
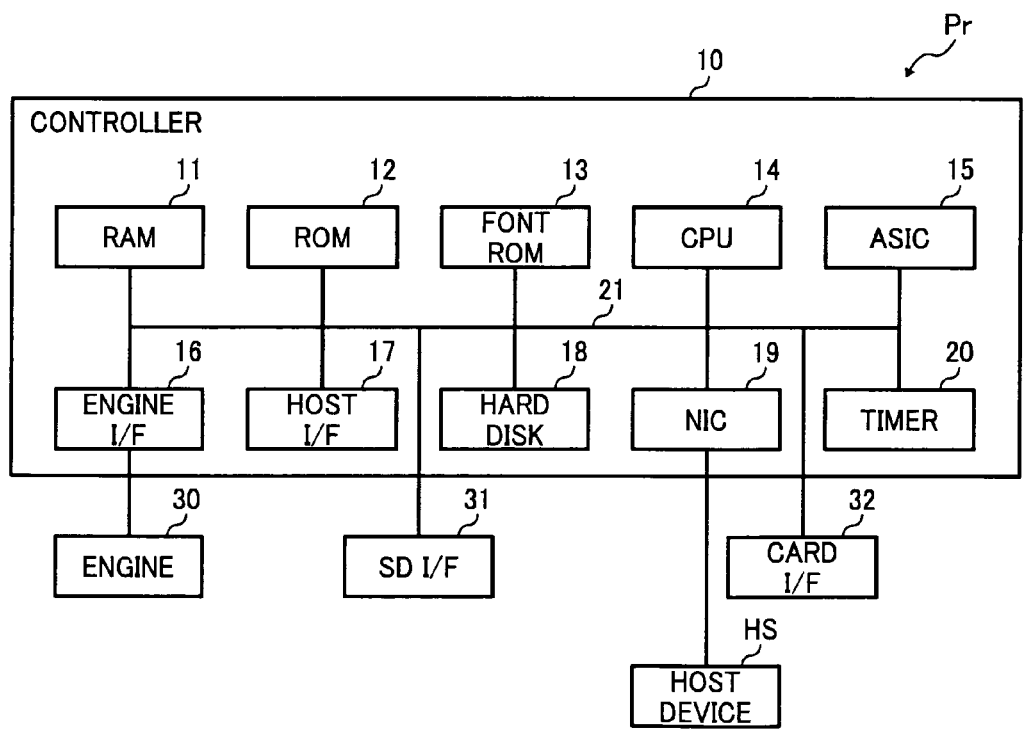
FIG. 1 is a block diagram illustrating essential units of a printer employing a first embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals and reference characters designate identical or corresponding parts throughout the several views thereof, particularly to FIG. 1, image forming apparatuses according to exemplary embodiments of the present invention are described.

FIGS. 1 through 4 illustrate a first embodiment of an image forming apparatus, an image forming method, and a storage medium according to the present invention. FIG. 1 is a block diagram illustrating essential units of a printer (image forming apparatus) Pr employing the first embodiment of the image forming apparatus, the image forming method, and the storage medium.

Referring to FIG. 1, the printer Pr includes a controller 10, an engine 30, an SD I/F (interface) 31, and a card I/F 32 and is connected to a host device HS.

The controller 10 is a generic term used to describe a control unit that, for example, converts print data written in an actual page description language into rendering data (video data) and outputs the rendering data to the engine 30 under conditions in a print correction mode set by, for example, a driver of the printer Pr or the host device HS. The controller 10 includes modules such as a RAM (Random Access Memory) 11, a ROM (Read Only Memory) 12, a font ROM 13, a CPU (Central Processing Unit) 14 (control device), an ASIC (Application Specific Integrated Circuit) 15, an engine I/F 16, a host I/F 17, a hard disk 18, a NIC (Network Interface Card) 19, and a timer 20, which are connected together via a bus 21.

The engine 30 receives rendering data and a control signal from the controller 10 to perform printing by a particular method, such as an electrophotographic method. For example, the engine 30 employing the electrophotographic method includes components, not shown, such as a photosensitive element, an optical writing unit, a development unit, a charging unit, a transfer unit, a fixing unit, and a cleaning unit, which are necessary for printing on a sheet of paper (printing medium) with the rendering data by the electrophotographic method. The process of printing by the engine 30 is as follows: The rendering data and the control signal activate the optical writing unit, which forms a latent electrostatic image on the photosensitive element. The latent electrostatic image is developed into a toner image by the development unit that supplies toner to the photosensitive element. The toner image thus formed on the photosensitive element is transferred to a sheet of paper, which is supplied from a paper feed unit to a space between the photosensitive element and the transfer unit. Then, the sheet with the toner image is conveyed to the fixing unit, where the toner image is fixed by application of heat and pressure.

The SD I/F 31 is an interface or an insertion slot for a detachable external storage medium (such as an SD (Secure Digital) card, which is referred to as a memory card hereinafter). The SD I/F 31 recognizes insertion and removal of the memory card based on, for example, a change in voltage, and outputs the recognition result to the CPU 14.

The card I/F 32 is a slot for connecting an external accounting device and inserting an authentication card. The card I/F 32 is used to exchange data with the external accounting device and exchange signals with the authentication card.

The controller 10 is connected to the host device HS such as a personal computer via the NIC 19. The host I/F 17 is an interface that receives print data and a control signal transmitted from the host device HS to the printer Pr and transmits a status signal from the printer Pr to the host device HS.

The ROM 12 stores a basic program for the printer Pr, a rendering, arranging, and printing program (an image forming, control program), and necessary data. It should be noted that the programs, in particular, the rendering, arranging, and printing program is not limited to the program stored in the ROM 12 and can be stored in, for example, the hard disk 18.

The CPU 14 controls each unit of the printer Pr according to the programs stored in the ROM 12, performs basic control for the printer Pr, and performs a rendering, arranging, and printing process.

The RAM 11 serves as a memory for storing rendering frames and is used as a work memory of the CPU 14, as a buffer that manages and temporarily stores print data sent from the host device HS individually for each page, and as a rendering frame (bitmap memory) on which rendering data, which is an actual print pattern converted from the data stored in the buffer, are rendered.

The font ROM 13 stores various fonts, which are retrieved by the CPU 14 for use in printing by the printer Pr.

The ASIC 15 performs basic data processing for the printer Pr and data processing in the rendering, arranging, and printing process according to the programs stored in the ROM 12.

The CPU 14 and the ASIC 15 integrally function together as a frame creator that creates at least one rendering frame in the RAM 11, as a renderer that renders rendering data on the at least one rendering frame based on print data, and as a control device configured to arrange the rendering data according to a sequence of the print data in duplex printing.

The engine I/F 16 is connected to the engine 30 so that the controller 10 outputs a control signal to the engine 30 and receives a status signal transmitted from the engine 30.

The hard disk 18 serves as another memory and stores document data information, document data, and print data under control of the CPU 14 and the ASIC 15. A rendering frame on which rendering data are rendered is created in the hard disk 18 as necessary.

The timer 20 includes an oscillator and a frequency divider circuit, and keeps track of current time or of a particular time.

The printer Pr is configured to perform the rendering, arranging, and printing process performed by reading and storing the rendering, arranging, and printing program (the image forming control program) stored in a storage medium such as a CD (Compact Disk), an MO (Magnetooptic Disk), a CD-ROM (Compact Disk Read Only Memory), a CD-RW (Compact Disk Rewritable), a DVD (Digital Video Disk), a memory card, and a flexible disk into the ROM 12 or the hard disk 18, and executing the program.

When the printer Pr receives print data from the host device HS connected to the NIC 19, the CPU 14 analyzes the print data according to a data analysis program in the rendering, arranging, and printing program stored in the ROM 12 or the hard disk 18 to separate printing character data and print control data (such as SP, CR, LF, HT, VT, etc.) from the rest of the print data. The CPU 14 temporarily stores the printing character data and the print control data in a receiving buffer in the RAM 11. The stored data are retrieved one at a time and processed according to the rendering, arranging, and printing program. For example, when the retrieved data are character codes, the CPU 14 generates an intermediate code that contains a printing character position, a printing character size, a character code, and font information, and stores the intermediate code in an intermediate buffer provided in the RAM 11. When the retrieved data are control codes or commands such as an escape sequence, the CPU 14 performs processing predefined therefor. Specifically, when the command specifies a printing character position, the CPU 14 sets the following character code at the specified position. When the command is a font change command, the CPU 14 performs processing so that the following character code has the font information as specified in the command. When the CPU 14 has performed processing according to the print command sent from the host device HS or when the data processed as specified in the command exceed one page, the CPU 14 converts the following intermediate code stored in the intermediate buffer into rendering data and renders the rendering data on the rendering frame created in the RAM 11 according to the rendering, arranging, and printing program. After the CPU 14 completes conversion of the intermediate code into the rendering data, the controller 10 issues a print start command to the engine 30 via the engine I/F 16 and transfers the rendering data to the engine 30 in sync with the command.

Through the sequence of processes described above, the printer Pr prints out the print data sent from the host device HS on a sheet by using the engine 30.

The printer Pr has a duplex printing function. When the host device HS sends print data that specify duplex printing, the printer Pr creates two or more rendering frames in the RAM 11, sequentially renders the rendering data on two of the rendering frames, and performs printing on front and back sides of a sheet of paper with the rendering data on the two rendering frames by using the engine 30.

Operation according to the first embodiment is now described. The printer Pr according to the first embodiment creates two rendering frames in duplex printing, renders rendering data on the two rendering frames, and moves the rendering data between the rendering frames according to the printing sides.

In duplex printing, a duplex print command, print data (of page one), print data (of page two), a frame specification (change) command, and a page specification cancellation command, which are written in a page description language, are used. When the frame specification command and the page specification cancellation command are added to the end of the two-page print data, the front and back sides of the print data are determined upon completion of data rendering. When the frame specification command is added to the head of the two-page print data, the front and back sides of the print data are determined prior to data rendering.

When the controller 10 receives print data from the host device HS, the CPU 14 analyzes the print data according to the data analysis program in the rendering, arranging, and printing program in the ROM 12 or the hard disk 18 to separate printing character data and print control data from the rest of the print data as described above and temporarily stores the printing character data and the print control data in the receiving buffer in the RAM 11. The stored data are retrieved one at a time and processed according to the rendering, arranging, and printing program in the ROM 12 or the hard disk 18 to perform the rendering, arranging, and printing process illustrated in FIG. 2.

Figure 2:
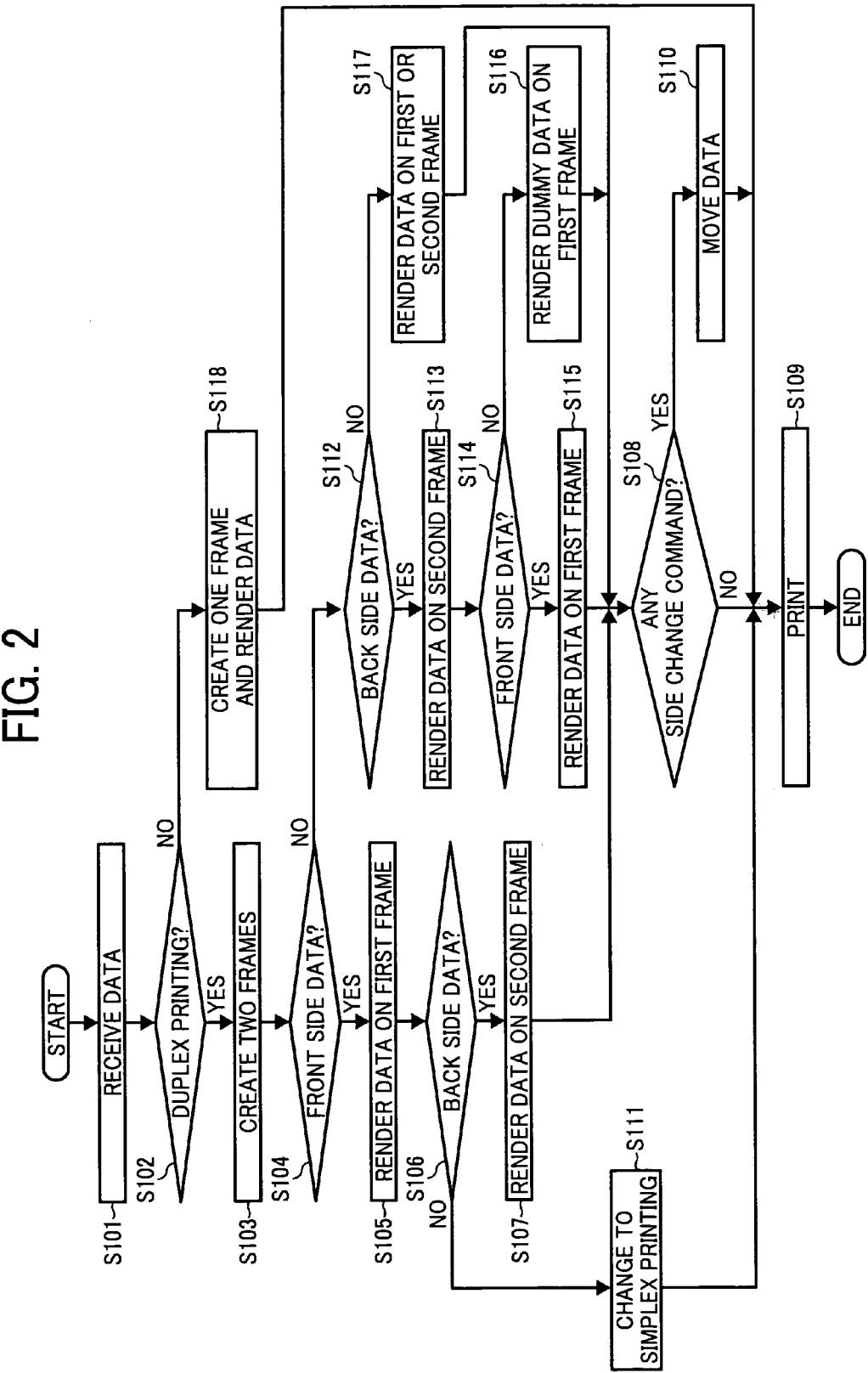
FIG. 2 is a flowchart illustrating a rendering, arranging, and printing process performed by the printer of FIG. 1.

Specifically, as illustrated in FIG. 2, when receiving print data (step S101), the controller 10 determines whether or not the print data are for duplex printing by analyzing the data (step S102). If the print data are for duplex printing, the controller 10 creates two rendering frames, i.e., a first frame for the front side (a first rendering frame for the front side) and a second frame for the back side (a second rendering frame for the back side) in the RAM 11 as illustrated in FIG. 3 (step S103) and determines whether or not the first print data are for the front side (step S104).

If the first print data are determined as being for the front side at step S104, the controller 10 renders rendering data for the front side based on the first print data for the front side on the first frame (step S105). Then, the controller 10 determines whether or not the second print data are for the back side (step S106). If the second print data are determined as being for the back side at step S106, the controller 10 renders rendering data for the back side based on the second print data for the back side on the second frame (step S107), and determines if there is a side change command (step S108).

If the controller 10 determines that there is no side change command at step S108, the controller 10 sends the rendering data on the first frame via the engine I/F 16 to the engine 30 to print out the data by the engine 30, and then sends the rendering data on the second frame to the engine 30 to print out the data by the engine 30, thereby performing duplex printing (step S109).

If the controller 10 identifies a side change command at step S108 for the print data received in order of the print data for the front side and then the print data for the back side, the controller 10 moves the rendering data so that the rendering data for the back side are on the rendering frame for the front side and the rendering data for the front side are on the rendering frame for the back side, which is referred to as arranging the data (step S110). The controller 10 performs duplex printing with the data on the first and second frames (step S109).

If the controller 10 determines that the second print data are not for the back side at step S106, the controller 10 changes duplex printing to simplex printing (step S111) and performs printing (step S109).

If the controller 10 confirms that the first print data are not for the front side or is unable to determine the front and back sides of the first print data at step S104, the controller 10 determines whether or not the first print data are for the back side (step S112). If the controller 10 confirms that the first print data are for the back side, the controller 10 renders rendering data based on the first print data for the back side on the second frame as illustrated in the upper part of FIG. 4A (step S113), and then determines whether or not the second print data are for the front side (step S114).

As described above, when print data for the back side are received first, the controller 10 renders rendering data based on the first print data for the back side on the second frame for the back side as illustrated in the upper part of FIG. 4A.

If the second print data are determined as being for the front side at step S114, the controller 10 renders rendering data based on the second print data for the front side on the first frame as illustrated in the lower part of FIG. 4A so that the rendering data for the front side are on the first frame and the rendering data for the back side are on the second frame (step S115) and determines if there is a side change command (step S108).

If the controller 10 determines that there is no side change command at step S108, the controller 10 performs duplex printing in which the rendering data on the first frame and then the rendering data on the second frame are printed by the engine 30 (step S109). If the controller 10 identifies a side change command at step S108, the controller 10 moves the rendering data so that the rendering data for the back side are on the rendering frame for the front side and the rendering data for the front side are on the rendering frame for the back side (arranging data) (step S110). The controller 10 performs duplex printing with the rendering data on the first and second frames (step S109).

If the second print data are determined as not being for the front side at step S114, the controller 10 renders dummy data on the first frame as illustrated in FIG. 4B (step S116) and determines if there is a side change command (step S108). Specifically, when the print data for the back side are received first and without following print data for the front side, the controller 10 inserts dummy data into the first frame as a substitute for rendering data generated from print data for the front side, so that the front side is printed blank and printing on the back side is performed thereafter.

If the controller 10 determines that there is no side change command at step S108, the controller 10 performs duplex printing in which the dummy data on the first frame and then the rendering data for the back side on the second frame are printed by the engine 30 (step S109).

If the controller 10 identifies a side change command at step S108, the controller 10 moves the data (arranging data) (step S110), and performs duplex printing with the data on the first and second frames (step S109).

If the first print data are determined as not being for the back side at step S112, i.e., if the controller 10 is unable to determine the front and back sides of the print data, the controller 10 renders rendering data based on the print data on either the first or the second frame (step S117) and determines if there is a side change command (step S108).

When the controller 10 renders rendering data on the first or the second frame at step S117 and determines that there is no side change command at step S108, the controller 10 changes duplex printing to simplex printing and performs printing with the rendering data on the first or the second frame (step S109).

When the controller 10 renders rendering data on the first or the second frame at step S117 and identifies a side change command at step S108, the controller 10 moves the rendering data (arranging data) (step S110), and performs printing with the data on the first or the second frame (step S109).

As illustrated in FIG. 4C, when the controller 10 renders rendering data on the second frame at step S117 and identifies a side change command at step S108, the controller 10 moves the rendering data on the second frame to the first frame (arranging data) (step S110), and changes duplex printing to simplex printing on the front side, so that only the rendering data on the first frame are printed on the front side (step S109).

If the data are determined as being for simplex printing at step S102, the controller 10 creates only one rendering frame and renders rendering data based on the received print data on the rendering frame (step S118) and sends the rendering data on the rendering frame via the engine I/F 16 to the engine 30 to print out the data by the engine 30, thereby performing simplex printing on the front side (step S109).

Accordingly, in duplex printing, the printer Pr according to the first embodiment creates two rendering frames in the RAM, renders rendering data based on print data on the two rendering frames, specifies the order in which the rendering data are rendered on the two rendering frames, and/or moves the rendering data based on the sequence of the print data for front and back sides for duplex printing and timing of identifying the sequence.

Therefore, rendering and processing of rendering data are appropriately controlled according to data structure of the print data and purpose of printing, resulting in high-speed duplex printing with improved operability.

Also, in the printer Pr according to the first embodiment, the CPU 14 creates two rendering frames, i.e., a first frame as a first rendering frame for the front side and a second frame as a second rendering frame for the back side in the RAM 11. When the sequence of the print data is identified after data rendering on the rendering frames, the CPU 14 sequentially renders rendering data based on the print data first on the first frame and then on the second frame. The CPU 14 moves the rendering data upon confirmation that the rendering data for the back side are on the first frame and the rendering data for the front side are on the second frame after data rendering.

Accordingly, when the sequence of the print data is identified after data rendering on the rendering frames, duplex printing is performed by matching the front and back sides of a printing sheet for duplex printing and the front and back sides of the rendering data.

In addition, in the printer Pr according to the first embodiment, when the sequence of the print data is identified before data rendering on the rendering frames, the CPU 14 renders rendering data for the front side on the first frame and rendering data for the back side on the second frame.

Accordingly, when the sequence of the print data is identified before data rendering on the rendering frames, data rendering is performed by matching the front and back sides of a printing sheet for duplex printing and the front and back sides of the rendering data. Therefore, processing such as moving of the rendering data is reduced, thereby achieving more speedy and appropriate duplex printing.

Also, in the printer Pr according to the first embodiment, when the sequence of the print data is identified before data rendering and print data for the back side are received first and without following print data for the front side, rendering data based on the print data for the back side are rendered on the second frame and dummy data are rendered on the first frame.

Accordingly, in printing only on the back side with the front side blank, dummy data are rendered on the first frame without unnecessary transmission or data analysis of dummy data, thereby achieving appropriate duplex printing with improved throughput.

It should be noted that any combination of the above-described steps can be performed in the printer Pr according to the first embodiment as opposed to the controller 10.

FIGS. 5 through 12 illustrate a second embodiment of an image forming apparatus, an image forming method, and a storage medium according to the present invention. FIG. 5 is a flowchart illustrating a rendering, arranging, and printing process performed by a printer employing the second embodiment of the image forming apparatus, the image forming method, and the storage medium.

The second embodiment is applied to the printer similar to the printer Pr according to the first embodiment. It should be noted that the reference numerals and reference characters used in the first embodiment are also used in the following description of the second embodiment as necessary.

The printer Pr according to the second embodiment creates three rendering frames and performs the rendering, arranging, and printing process illustrated in FIG. 5. Specifically, as illustrated in FIG. 5, when the printer Pr receives print data (step S201), the controller 10 determines whether or not the print data are for duplex printing by analyzing the data (step S202). If the print data are for duplex printing, the controller 10 creates three rendering frames in the RAM 11 (step S203) and determines whether or not the front and back sides of the print data are fixed (step S204).

If the front and back sides of the print data are determined as being fixed at step S204, the controller 10 converts the print data into rendering data and renders the rendering data on the fixed frames. Specifically, the print data for the front side are converted into rendering data and rendered on the first frame, and the print data for the back side are converted into rendering data and rendered on the second frame (step S205). The controller 10 then determines if there is a side change command (step S206).

If the front and back sides of the print data are determined as not being fixed at step S204, the controller 10 converts the print data into rendering data and renders the rendering data without sides being fixed, i.e., renders the rendering data on two of the three rendering frames in order of receiving the print data and according to a particular rendering rule (step S209). The controller 10 then determines if there is a side change command (step S206).

More specifically, in duplex printing, the controller 10 creates a first frame for the front side (a first rendering frame for the front side), a second frame for the back side (a second rendering frame for the back side), and a third frame (an extra rendering frame) for temporary use in the RAM 11 as illustrated in FIG. 6.

Figure 7A:
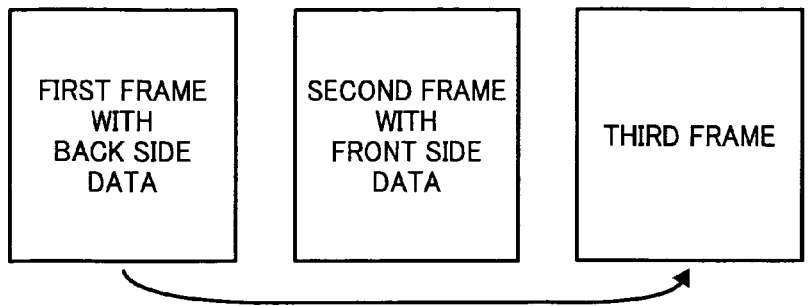
FIGS. 7A, 7B, 7C, and 7D are diagrams illustrating a process of moving rendering data rendered first on the first frame and then on the second frame in the process shown in FIG. 5.
Figure 8A:
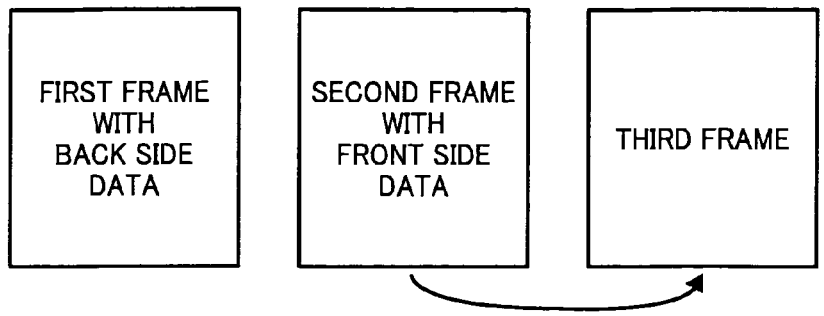
FIGS. 8A, 8B, 8C, and 8D are diagrams illustrating another process of moving rendering data rendered first on the first frame and then on the second frame in the process shown in FIG. 5.
Figure 9A:
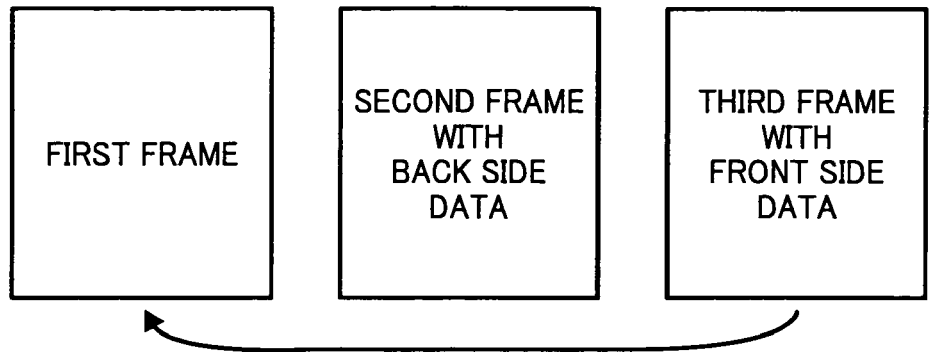
FIGS. 9A, 9B, 9C, 9D, and 9E are diagrams illustrating a process of moving rendering data rendered first on the second frame and then on the third frame in the process shown in FIG. 5.
Figure 10A:
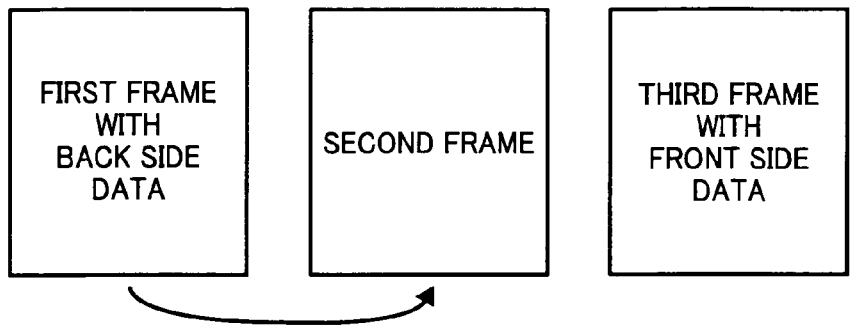
FIGS. 10A, 10B, and 10C are diagrams illustrating a process of moving rendering data rendered first on the first frame and then on the third frame in the process shown in FIG. 5.

When the front and back sides of the print data are fixed after data rendering on the rendering frames, the controller 10 converts the print data into rendering data and renders the rendering data on two rendering frames selected according to a particular rendering rule. For example, the rendering data based on the received print data are rendered first on the first frame and then on the second frame as illustrated in FIG. 7A or 8A, first on the second frame and then on the third frame as illustrated in FIG. 9A, first on the first frame and then on the third frame as illustrated in FIG. 10A, or first on a predetermined frame and then on a rendering frame selected from the other two rendering frames based on a size (amount) of the second received print data, which is not shown.

Further, processing speed can be prioritized by selecting a rendering rule with a fastest processing speed from the above-described rendering rules or by selecting a rendering frame processed at a fastest processing speed from the three rendering frames based on the amount of rendering data. In this case, the host device HS first sends information on the size and the amount of a rendering area of each page as a page information command. Based on the information transmitted with the page information command, a rendering rule or a rendering frame is selected to reduce the chances of moving rendering data generated from large page data from one rendering frame to another rendering frame.

As for the data size, a ratio of rendered area to sheet area or a net size of print data of each page transmitted from the host device HS is used. The information regarding the ratio or the net size of each page is added to the head of the print data. When it is difficult to perform detailed ratio calculation, for example, calculation of curves, the rendered area can be a quadrangular area including the rendered area, which is calculated by maximum and minimum values of rendering objects. The information of each page is acquired at the beginning, thereby enabling control to reduce the chances of moving data with a high area ratio from one rendering frame to another rendering frame.

Still further, when the print data for the back side are determined to be received first and followed by print data for the front side of next printing (either simplex or duplex printing), rendering data generated from the first print data for the back side are rendered on the second frame, rendering data generated from the second print data are rendered on the third frame, and dummy data (blank) are rendered on the first frame.

It should be noted that although three rendering frames are created in the RAM 11 in the above description, the rendering frames may be created on another memory such as the hard disk 18 when the capacity of the RAM 11 is insufficient to create three frames. In this case, the rendering data rendered on the other memory are printed by moving the rendering data to the RAM 11.

Further, after printing on one sheet, the CPU 14 can use the third frame for next duplex printing. Since the third frame is not used for printing, the third frame with no data can be used in preparing rendering frames for next duplex printing.

If the controller 10 determines that there is no side change command at step S206, the controller 10 sends the rendering data on the first frame via the engine I/F 16 to the engine 30 to print out the data by the engine 30, and then sends the rendering data on the second frame to the engine 30 to print out the data by the engine 30, thereby performing duplex printing (step S207).

If the controller 10 identifies a side change command at step S206, the controller 10 moves data so that rendering data specified for the front side are on the first frame and rendering data specified for the back side are on the second frame (arranging data) (step S208). After the data are moved, the controller 10 sends the rendering data on the first frame via the engine I/F 16 to the engine 30 to print out the data by the engine 30, and then sends the rendering data on the second frame to the engine 30 to print out the data by the engine 30, thereby performing duplex printing (step S207).

Figure 11:
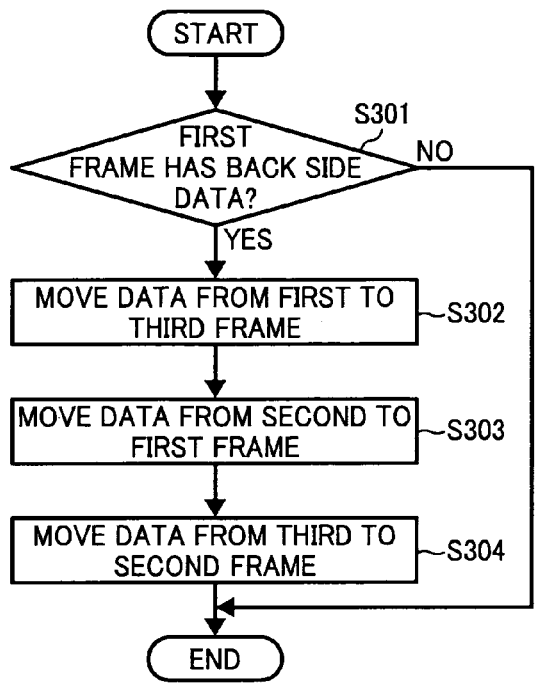
FIG. 11 is a flowchart illustrating the process of moving rendering data rendered first on the first frame and then on the second frame in the process shown in FIG. 5.
Figure 12:
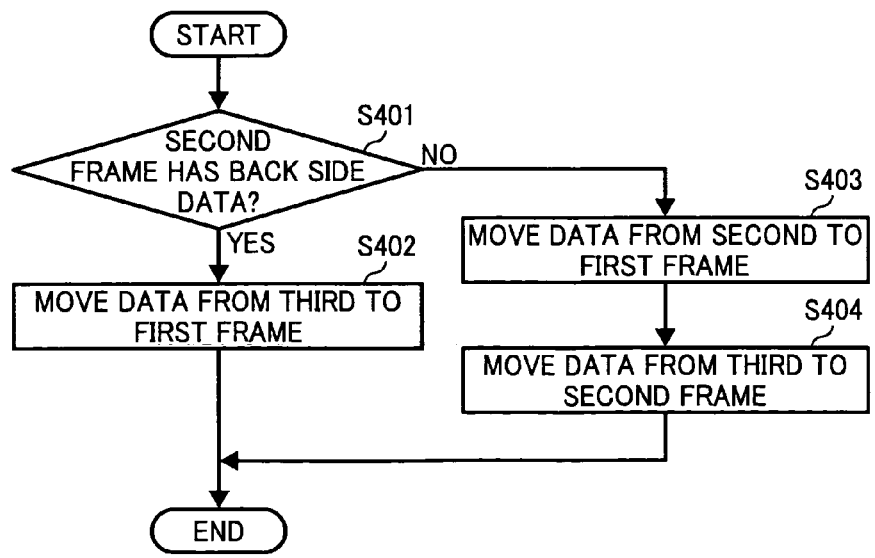
FIG. 12 is a flowchart illustrating the process of moving rendering data rendered first on the second frame and then on the third frame in the process shown in FIG. 5.
Figure 13:
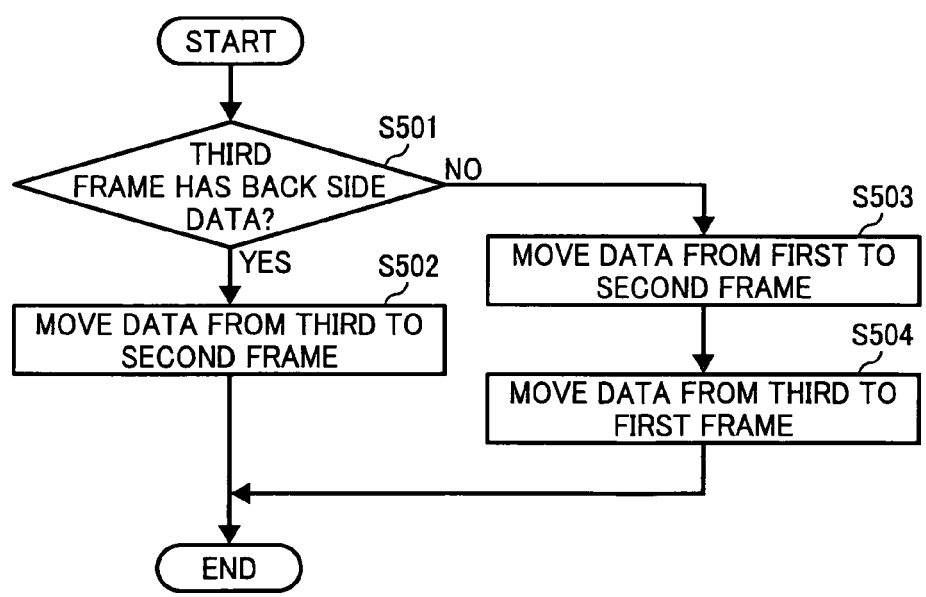
FIG. 13 is a flowchart illustrating the process of moving rendering data rendered first on the first frame and then on the third frame in the process shown in FIG. 5.

At step S208, the controller 10 performs processing illustrated in FIGS. 11 through 13 according to the above-described rendering rules.

Specifically, when the controller 10 renders the rendering data first on the first frame and then on the second frame, the controller 10 determines whether or not the rendering data on the first frame are for the back side (step S301) as illustrated in FIG. 11. If the rendering data on the first frame are for the front side, the controller 10 determines that there is no need to move data, and the processing ends.

Figure 7B:
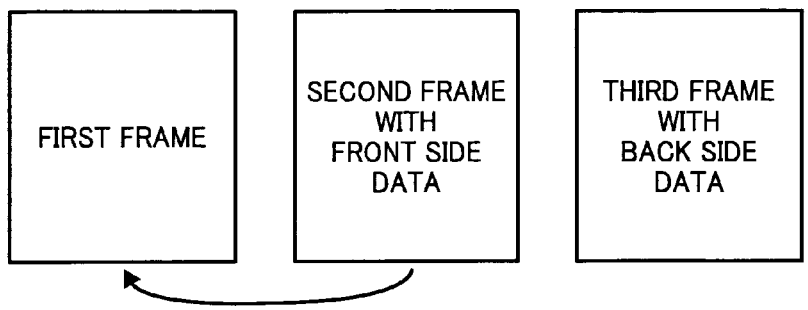
Figure 7C:
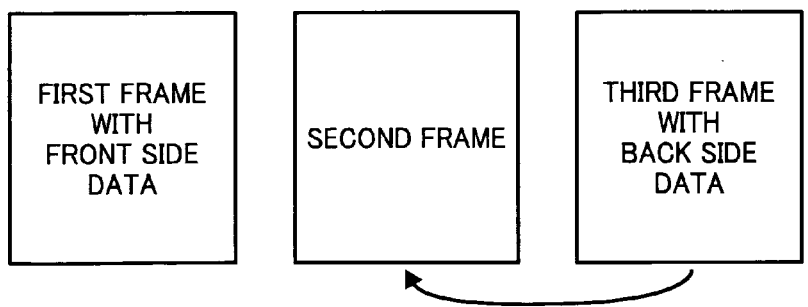
Figure 7D:
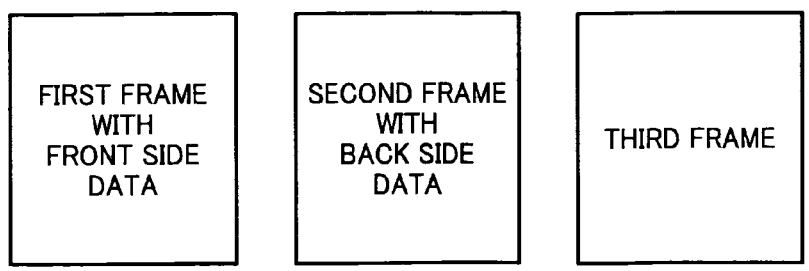

If the rendering data on the first frame are determined as being for the back side at step S301, the controller 10 confirms the necessity of moving data and moves the rendering data for the back side on the first frame to the third frame as illustrated in FIG. 7A (step S302), moves the rendering data for the front side on the second frame to the first frame as illustrated in FIG. 7B (step S303), and moves the rendering data for the back side on the third frame to the second frame as illustrated in FIG. 7C, so that the rendering data for the front side are on the first frame and the rendering data for the back side are on the second frame as illustrated in FIG. 7D (step S304).

Figure 8B:
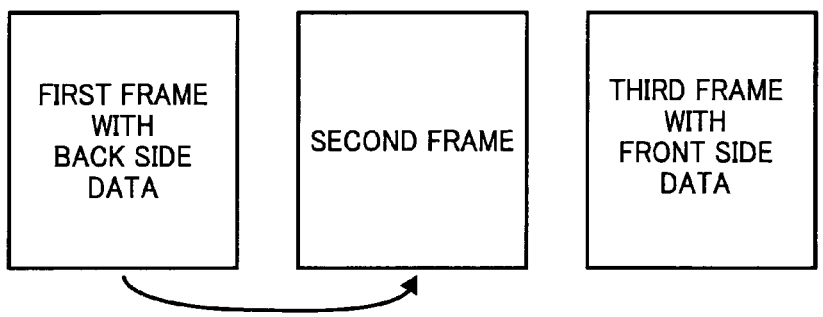
Figure 8C:
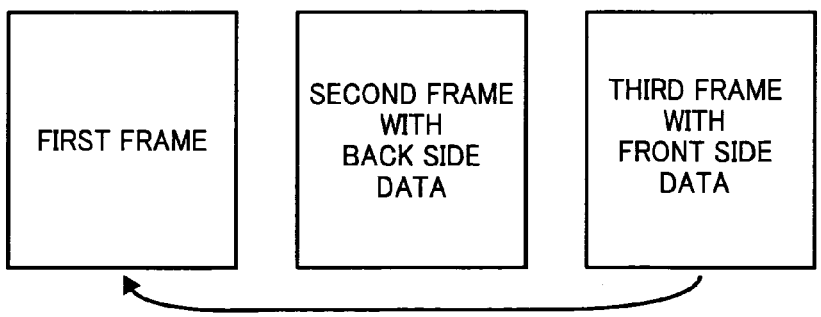
Figure 8D:
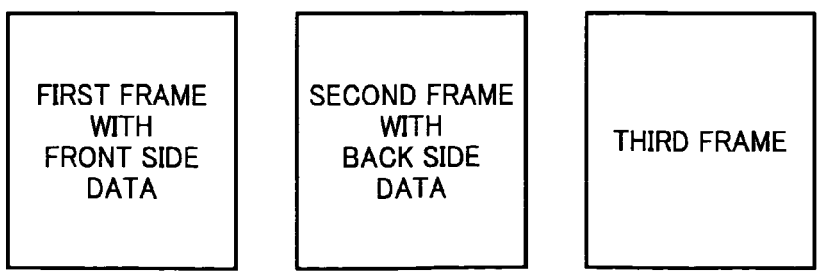

It should be noted that the procedure in which the rendering data are moved in this case is not limited to the above-described procedure and the rendering data can be moved as illustrated in FIGS. 8A through 8D. Specifically, the controller 10 moves the rendering data for the front side on the second frame to the third frame as illustrated in FIG. 8A, moves the rendering data for the back side on the first frame to the second frame as illustrated in FIG. 8B, and moves the rendering data for the front side on the third frame to the first frame as illustrated in FIG. 8C, so that the rendering data for the front side are on the first frame and the rendering data for the back side are on the second frame as illustrated in FIG. 8D.

When the controller 10 renders the rendering data first on the second frame and then on the third frame, the controller 10 determines whether or not the rendering data on the second frame are for the back side (step S401) as illustrated in FIG. 12.

Figure 9B:
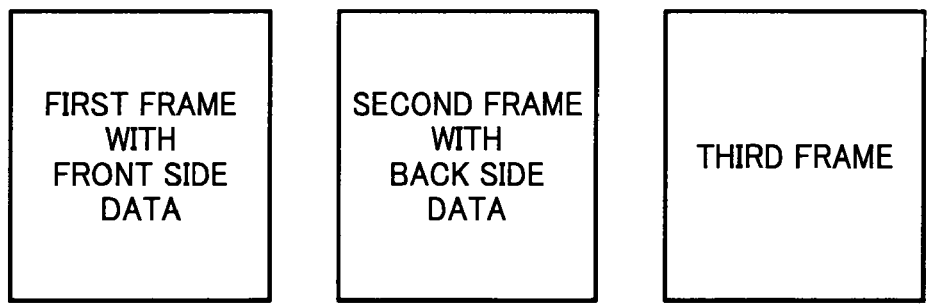

If the rendering data on the second frame are for the back side, the controller 10 confirms that the rendering data on the third frame are for the front side and moves the rendering data for the front side on the third frame to the first frame as illustrated in FIG. 9A (step S402), so that the rendering data for the front side are on the first frame and the rendering data for the back side are on the second frame as illustrated in FIG. 9B, and the processing ends.

Figure 9C:
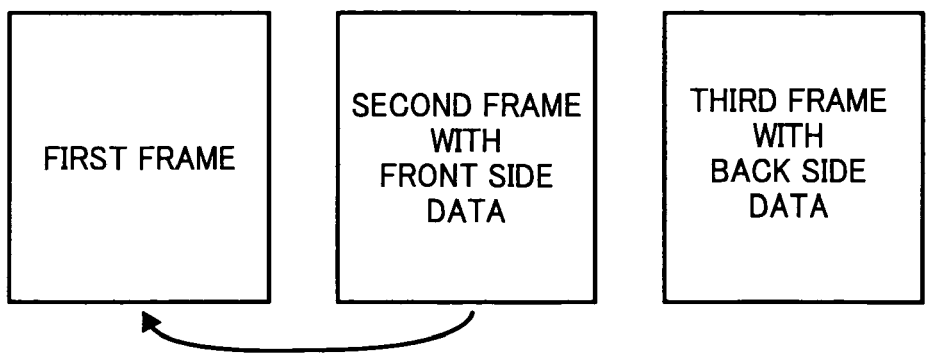
Figure 9D:
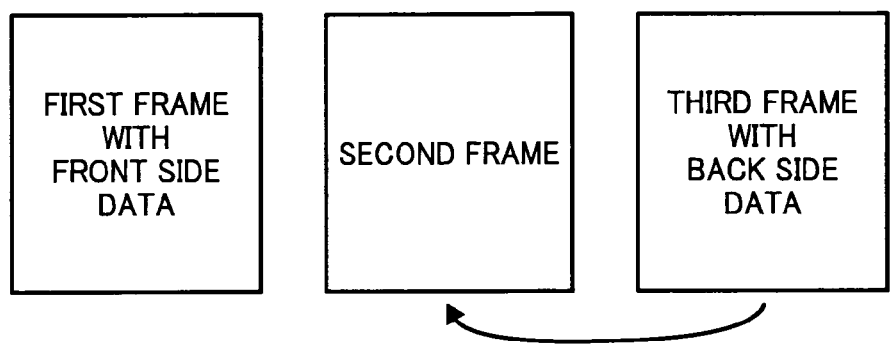
Figure 9E:
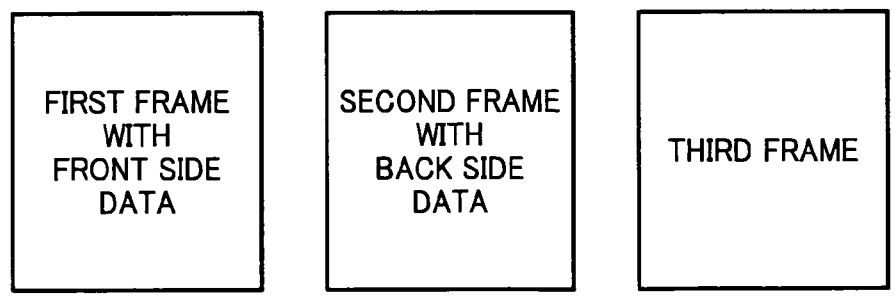

If the rendering data on the second frame are determined as being for the front side at step S401, the controller 10 moves the rendering data for the front side on the second frame to the first frame as illustrated in FIG. 9C (step S403) and moves the rendering data for the back side on the third frame to the second frame as illustrated in FIG. 9D (step S404), so that the rendering data for the front side are on the first frame and the rendering data for the back side are on the second frame as illustrated in FIG. 9E, and the processing ends.

When the controller 10 renders the rendering data first on the first frame and then on the third frame, the controller 10 determines whether or not the rendering data on the third frame are for the back side (step S501) as illustrated in FIG. 13. If the rendering data on the third frame are for the back side, the controller 10 confirms that the rendering data on the first frame are for the front side and moves the rendering data for the back side on the third frame to the second frame (step S502), so that the rendering data for the front side are on the first frame and the rendering data for the back side are on the second frame, and the processing ends.

Figure 10B:
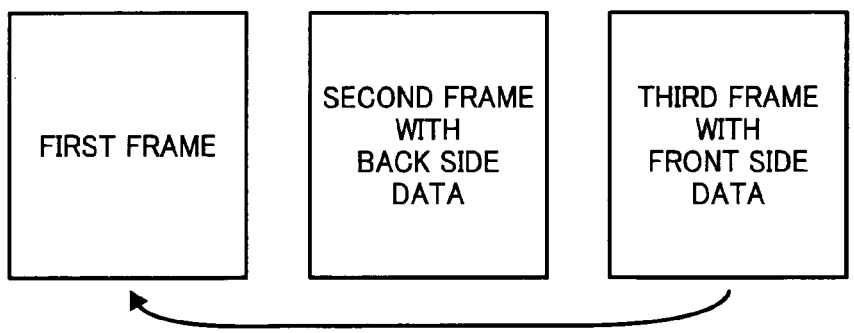
Figure 10C:
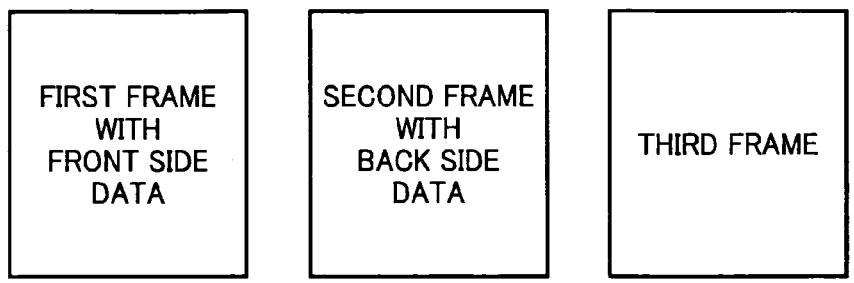

If the rendering data on the third frame are determined as being for the front side at step S501, the controller 10 confirms that the rendering data on the first frame are for the back side and moves the rendering data for the back side on the first frame to the second frame as illustrated in FIG. 10A (step S503) and moves the rendering data for the front side on the third frame to the first frame as illustrated in FIG. 10B (step S504), so that the rendering data for the front side are on the first frame and the rendering data for the back side are on the second frame as illustrated in FIG. 10C, and the processing ends.

If the data are determined as being for simplex printing at step S202 illustrated in FIG. 5, the controller 10 creates only one rendering frame and renders rendering data based on the received print data on the rendering frame (step S210) and sends the rendering data on the rendering frame via the engine I/F 16 to the engine 30 to print out the rendering data by the engine 30, thereby performing simplex printing (step S207).

Accordingly, in duplex printing by the printer Pr according to the second embodiment, the CPU 14 creates three rendering frames, i.e., a first frame as a first rendering frame for the front side, a second frame as a second rendering frame for the back side, and a third frame as an extra rendering frame. When the sequence of the print data is identified after data rendering on the rendering frames, the CPU 14 sequentially renders rendering data on two of the three rendering frames according to a particular rendering rule. The CPU 14 optionally moves the rendering data using the three rendering frames depending on the sequence of the print data, so that the rendering data for the front side are on the first frame and the rendering data for the back side are on the second frame.

Therefore, the rendering data are appropriately processed according to data structure of the print data and purpose of printing and moved more speedily and appropriately, resulting in high-speed duplex printing in an appropriate intended condition.

Also, in the printer Pr according to the second embodiment, the CPU 14 employs a rendering rule so that the rendering data are rendered first on the first frame and then on the second frame, first on the second frame and then on the third frame, first on the first frame and then on the third frame, first on a predetermined frame and then on a rendering frame selected based on an amount of the second print data, or on two rendering frames selected based on the amount of print data to prioritize processing speed.

Therefore, rendering and processing of the rendering data are appropriately performed according to data structure of the print data and purpose of printing and processing of moving rendering data is reduced, thereby achieving appropriate and more speedy duplex printing in an intended condition.

In addition, in the printer Pr according to the second embodiment, when the sequence of the print data is identified before data rendering on the rendering frames and print data for the back side are received first and followed by print data for the front side of next printing, the CPU 14 renders rendering data for the back side based on the first print data for the back side on the second frame, rendering data for the front side based on the second print data for the front side on the third frame, and dummy data on the first frame.

Accordingly, in printing only on the back side with the front side blank, dummy data are rendered on the first frame without unnecessary transmission or data analysis of dummy data, thereby achieving appropriate duplex printing with improved throughput.

Also, in the printer Pr according to the second embodiment, after duplex printing on one sheet, the CPU 14 uses the third frame for a subsequent duplex printing.

Accordingly, processing time for creating rendering frames can be shortened, thereby saving processing time for duplex printing.

It should be noted that any combination of the above-described steps can be performed in the printer Pr according to the second embodiment as opposed to the controller 10.

In each of the example embodiments described above, when the capacity of the RAM 11 used to store rendering frames is insufficient to create the particular number of rendering frames, i.e. two for the first embodiment and three for the second embodiment, another memory such as the hard disk 18 is used to temporarily create a rendering frame thereon to fill the shortage of the rendering frames.

Accordingly, when the RAM 11 has not enough free space due to other processing in the printer Pr, rendering frames are appropriately created and therefore duplex printing is appropriately performed.

It should be noted that any combination of the above-described steps can be performed in the printer Pr according to each of the example embodiments as opposed to the controller, and the printer Pr according to each of the example embodiments can perform both processes performed by creating two or three rendering frames in the memory or memories.

As can be understood by those skilled in the art, numerous additional modifications and variations are possible in light of the above teachings. It is therefore to be understood that, within the scope of the appended claims, the disclosure of this patent specification may be practiced otherwise than as specifically described herein.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program or computer program product. For example, the aforementioned methods may be embodied in the form of a system or device, including, but not limited to, any of the structures for performing the methodology illustrated in the drawings.

Any of the aforementioned methods may be embodied in the form of a program. The program may be stored on a computer-readable medium and adapted to perform any one of the aforementioned methods when run on a computer device (a device including a processor). The program may include computer-executable instructions for carrying out one or more of the steps above, and/or one or more of the aspects of the invention. Thus, the storage medium or computer-readable medium is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetic storage media, including but not limited to floppy disks (trademark), cassette tapes, and removable hard disks; media with a built-in rewriteable non-volatile memory, including but not limited to memory cards; and media with a built-in ROM, including but not limited to ROM cassettes, etc. Furthermore, various information regarding stored images, for example, property information, may be stored in any other form, or provided in other ways.

Example embodiments being thus described, it will be apparent that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image forming apparatus comprising:
   a controller configured to convert print data into rendering data and output the rendering data, the controller comprising:
   a memory;
   a frame creator configured to create three rendering frames for a single sheet in the memory, the three rendering frames including a first rendering frame for a front side of a recording medium, a second rendering frame for a back side of the recording medium, and an extra rendering frame in duplex printing;
   a renderer configured to render rendering data on the three rendering frames based on print data for the single sheet; and
   a control device configured to arrange the rendering data onto two of the three rendering frames according to a sequence of the print data for the single sheet in duplex printing;
   wherein, when the sequence of the print data is identified before rendering data, the renderer renders rendering data based on print data for the back side that are received first and followed by print data for the front side of next printing on the second rendering frame, rendering data based on print data for the front side of next printing on the extra rendering frame, and dummy data on the first rendering frame.

* * * * *